United States Patent
Lee et al.

(10) Patent No.: US 11,756,262 B2
(45) Date of Patent: Sep. 12, 2023

(54) MOBILE TERMINAL, AND 3D IMAGE CONVERSION METHOD THEREOF

(71) Applicant: LG ELECTRONICS INC., Seoul (KR)

(72) Inventors: Changhwan Lee, Seoul (KR); Yunsup Shin, Seoul (KR); Salkmann Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 17/434,312

(22) PCT Filed: Jun. 12, 2019

(86) PCT No.: PCT/KR2019/007088
§ 371 (c)(1),
(2) Date: Aug. 26, 2021

(87) PCT Pub. No.: WO2020/251075
PCT Pub. Date: Dec. 17, 2020

(65) Prior Publication Data
US 2022/0148259 A1 May 12, 2022

(51) Int. Cl.
*G06T 17/00* (2006.01)
*G06T 7/90* (2017.01)

(52) U.S. Cl.
CPC ............. *G06T 17/00* (2013.01); *G06T 7/90* (2017.01)

(58) Field of Classification Search
None
See application file for complete search history.

(56) References Cited

U.S. PATENT DOCUMENTS

| | | | |
|---|---|---|---|
| 2007/0025714 A1* | 2/2007 | Shiraki | H04N 23/73 348/E5.037 |
| 2013/0155233 A1* | 6/2013 | Dahlqvist | H04N 23/56 348/143 |
| 2013/0178868 A1* | 7/2013 | Roh | A61B 34/30 606/130 |
| 2015/0002734 A1 | 1/2015 | Lee | |
| 2016/0373728 A1* | 12/2016 | Cho | H04N 13/239 |

(Continued)

FOREIGN PATENT DOCUMENTS

| CN | 102333227 A | 1/2012 |
|---|---|---|
| CN | 102377875 A | 3/2012 |

(Continued)

*Primary Examiner* — Anh-Tuan V Nguyen
(74) *Attorney, Agent, or Firm* — Birch, Stewart, Kolasch & Birch, LLP

(57) ABSTRACT

The present invention relates to a mobile terminal and a method for controlling same, the mobile terminal comprising: a camera for recording a video; a display unit for displaying a recording screen of the video being recorded through the camera; and a control unit for, when a portion of the video being recorded satisfies a video upload requirement of at least one video upload service that can be provided from the mobile terminal, controlling to display an item indicating the video upload services for which the requirement is satisfied. The present invention provides the effect of allowing a user to quickly recognize an SNS to which a recorded portion of a video currently being recorded in real time can be uploaded, and easily upload the recorded portion to the SNS.

13 Claims, 17 Drawing Sheets

(56) References Cited

U.S. PATENT DOCUMENTS

| | | | |
|---|---|---|---|
| 2017/0142312 A1* | 5/2017 | Dal Mutto | H04N 13/106 |
| 2018/0020209 A1 | 1/2018 | Ko et al. | |
| 2018/0063403 A1* | 3/2018 | Ryu | H05B 47/19 |
| 2019/0204439 A1* | 7/2019 | Lu | G01S 17/89 |
| 2019/0333288 A1* | 10/2019 | Smet | G06T 19/006 |
| 2020/0364890 A1* | 11/2020 | Huang | H04N 23/56 |
| 2021/0264600 A1* | 8/2021 | Jellinggaard | A61C 13/0004 |

FOREIGN PATENT DOCUMENTS

| | | |
|---|---|---|
| CN | 107637058 A | 1/2018 |
| JP | 2002-152778 A | 5/2002 |
| JP | 2007-298665 A | 11/2007 |
| KR | 10-1273534 B1 | 6/2013 |
| KR | 10-1332386 B1 | 11/2013 |
| KR | 10-1430474 B1 | 8/2014 |

\* cited by examiner (a)

(b)

(a)

(b)

(c)

(a)

(b)

(a)

(b)

(a)

(b)

(c)

(a)

(b)

MOBILE TERMINAL, AND 3D IMAGE CONVERSION METHOD THEREOF

CROSS REFERENCE TO RELATED APPLICATIONS

This application is the National Phase of PCT International Application No. PCT/KR2019/007088, filed on Jun. 12, 2019, which is hereby incorporated by reference herein in their entirety.

TECHNICAL FIELD

The present disclosure relates to a mobile terminal and controlling method thereof, by which terminal use can be implemented in further consideration of user's convenience.

BACKGROUND ART

Generally, terminals can be classified as mobile/portable terminals and stationary terminals according to their mobility. The mobile terminals can be further classified as handheld terminals and vehicle mount terminals according to possibility of user's direct portability.

The mobile terminals have become increasingly more functional. Examples of such functions include data and voice communication, image and video capturing through a camera, voice recording, music file playback through a speaker system, and image and video displaying through a display unit. Some mobile terminals include additional functions for supporting game playing and working as multimedia players. In particular, current mobile terminals can receive multicast signals including visual contents such as videos and television programs.

As functions of a mobile terminal are diversified, the mobile terminal becomes the multimedia player with multiple functions of capturing images or videos, playing back music files or video files, gaming, and receiving broadcasting programs.

To support and increase the functionality of the terminal, the improvement of structural parts and/or software parts of the terminal can be taken into account.

On the other hand, a camera mounted on a conventional mobile terminal only generates two-dimensional (hereinafter referred to as '2D') images and cannot obtain depth information necessary for generating three-dimensional (hereinafter referred to as '3D') images.

Therefore, recently there are two ways to obtain depth information of an object as follows.

1. A first method of measuring depth information on an object by applying a laser light coded with a specific pattern to the object and calculating a shift amount of the pattern of reflective light returning from the object.

2. A second method of measuring depth information on an object by directly applying a light to the object in a Time Of Flight (TOF) manner and calculating the time of the reflective light returning from the object.

However, although the first method has the advantage of securing the stability of depth information, the stability of 2D images is unstable due to the problem of patch-level measurement and presence of a difference in view. Furthermore, the first method generally uses fixed focus lenses and passive coding elements, which makes it difficult to optimize depth resolution in various environments.

Next, the second method has a problem of being limitedly used due to the high price of a ToF-only sensor, which calculates the time proportional to a distance of reciprocating light reflected by being applied to an object, and high power consumption of a brightness-modulated light emitting LED. In other words, the stability of a 2D image is high but the stability of depth is unstable due to a pixel-level measurement and no difference in view.

DETAILED DESCRIPTION OF DISCLOSURE

Technical Task

To meet the aforementioned necessity and solve the above problems, one technical task of the present disclosure is to provide a mobile terminal and 3D image converting method thereof, by which depth information of a 2D image is obtained using infrared light and the 2D image is converted into a 3D image using the obtained depth information.

Technical Solutions

In one technical aspect of the present disclosure, provided is a mobile terminal including a first camera receiving a 2D image, a light emitting unit including a plurality of light emitting device arrays and applying a light to a space corresponding to the received 2D image, a second camera receiving the light reflecting from the space, and a controller configured to obtain depth information on the 2D image based on the received light and convert the 2D image into a 3D image based on the obtained depth information.

In another technical aspect of the present disclosure, provided is a method for 3D image conversion, the method including receiving a 2D image via a first camera, applying a light to a space corresponding to the received 2D image via a light emitting unit including a plurality of light emitting device arrays, receiving a light reflecting from the space via a second camera, obtaining depth information on the 2D image based on the received light, and converting the 2D image into a 3D image based on the obtained depth information.

Advantageous Effects

A mobile terminal and controlling method thereof according to the present disclosure are described as follows.

According to at least one of embodiments of the present disclosure, depth information of a 2D image may be obtained using infrared light and the 2D image may be converted into a 3D image using the obtained depth information.

BEST MODE FOR DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

The terms such as "include" or "has" should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
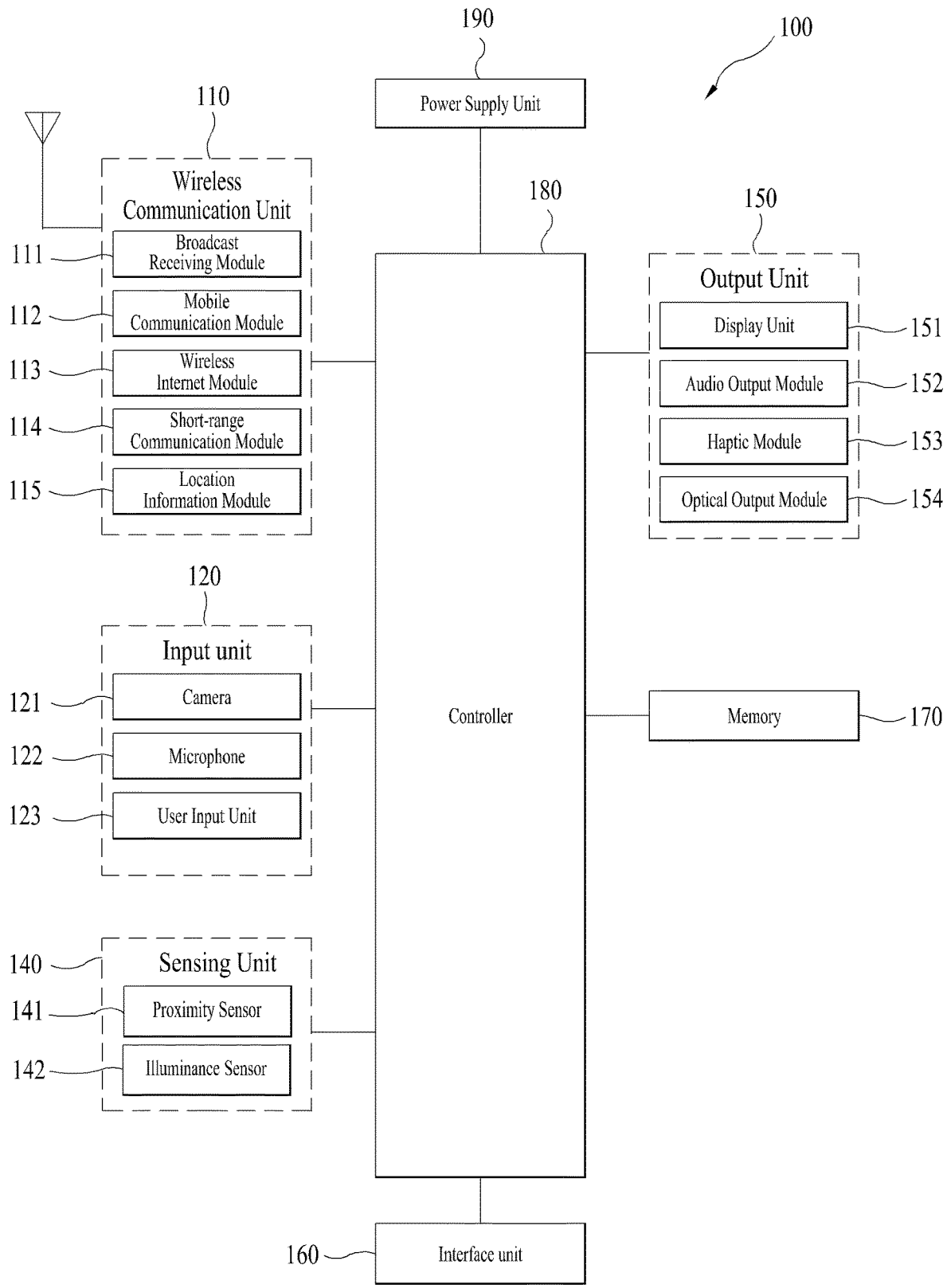
FIG. 1A is a block diagram of a mobile terminal in accordance with the present disclosure.
Figure 1B:
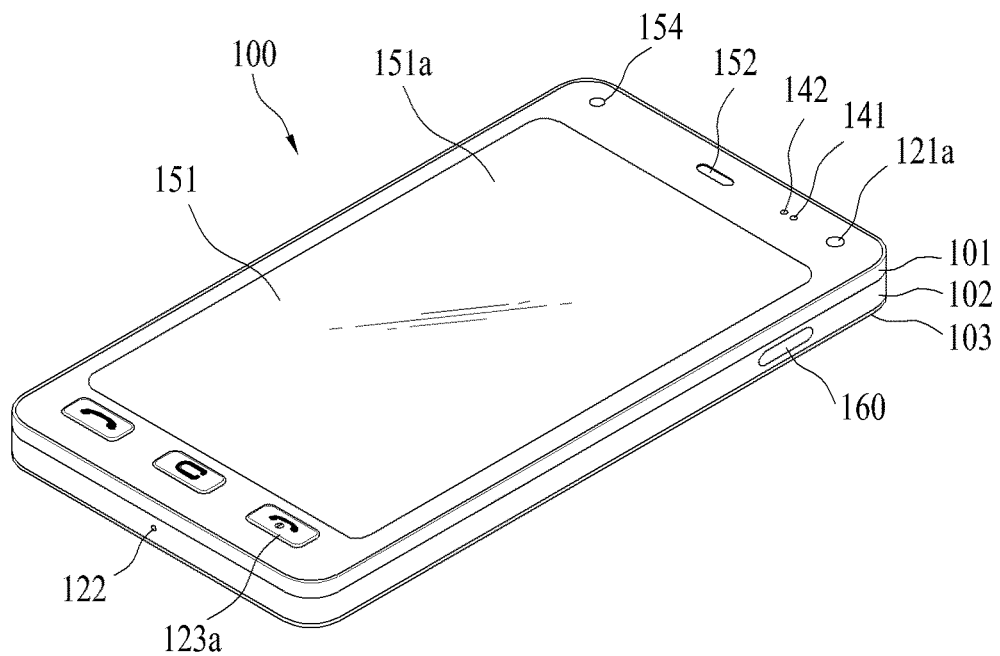
FIGS. 1B and 1C are conceptual views of one example of the mobile terminal, viewed from different directions.
Figure 1C:
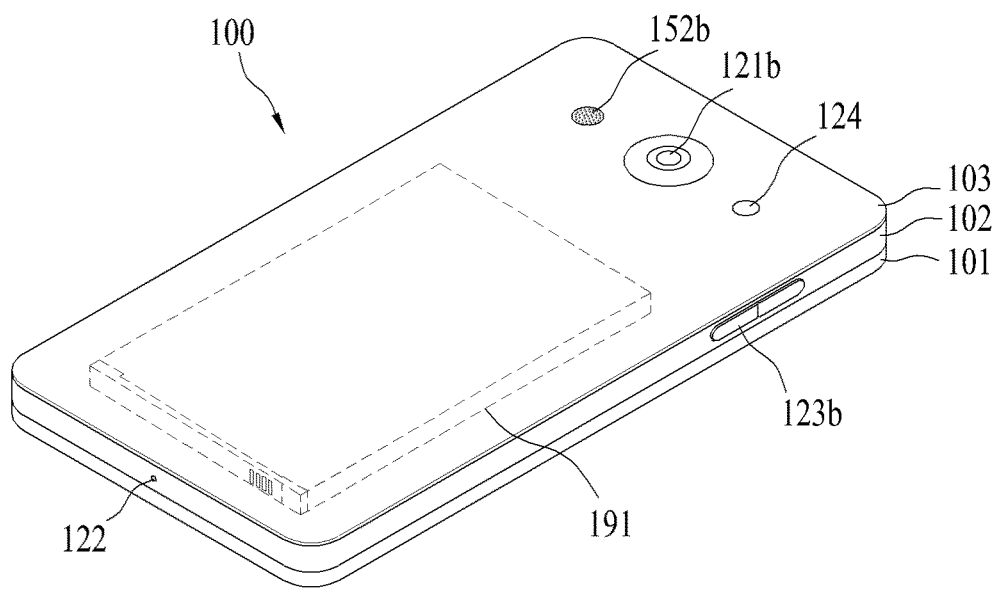

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTHTM, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 142, an optical output module 154, first and second cameras 121a and 121b, first and second manipulation units 123a and 123b, a microphone 122, an interface unit 160, etc.

In the following description, as shown in FIG. 1B and FIG. 1C, the display unit 151, the first audio output module 152a, the proximity sensor 141, the illumination sensor 142, the optical output module 154, the first camera 121a and the first manipulation unit 123a are disposed on a front side of the terminal body, the second manipulation unit 123b, the microphone 122 and the interface unit 160 are disposed on a lateral side of the terminal body, and the second audio output module 152b and the second camera 12b are disposed on the rear side of the terminal body. Such a mobile terminal 100 will be taken as an example in the following description.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program run in the mobile terminal 100 or User Interface/Graphic User Interface (UI/GUI) information according to such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver to deliver a call sound to a user's ear. The second audio output module 152b may be implemented in the form of a louder speaker to output various alarm sounds, multimedia audio reproduction sounds, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A 3D image converting apparatus and process of a mobile terminal 100 according to the present disclosure will be described in detail with reference to FIGS. 2 to 16 as follows.

The components of the 3D image converting apparatus shown in FIG. 2 below are described in a manner of differing from the components shown in FIG. 1 in reference numbers only to clearly and concisely describe the 3D image converting process, but components with the same name or function in FIG. 1 and FIG. 2 may perform the same operation. In addition, the operations of all the components in FIG. 1 may be performed in FIG. 2.

Figure 2:
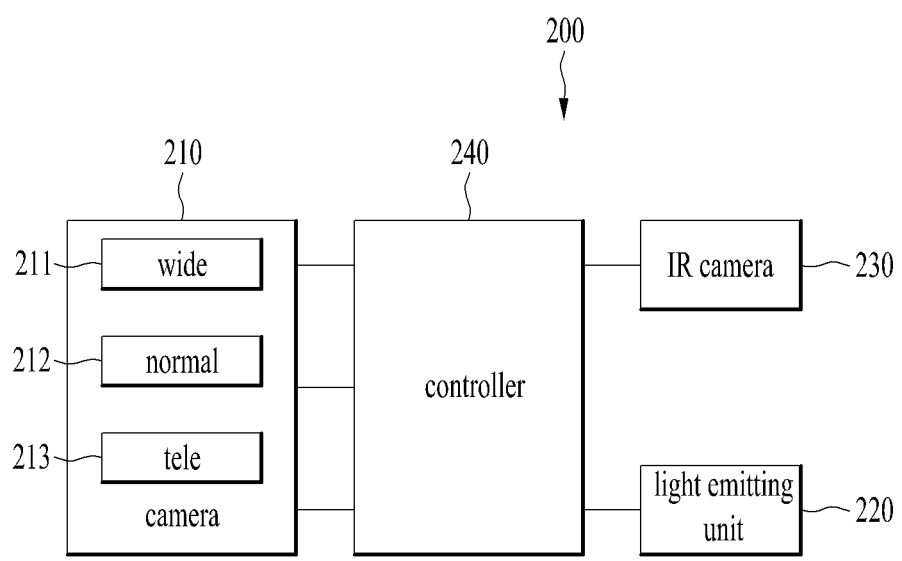
FIG. 2 is a block diagram to describe a 3D image converting device of a mobile terminal according to the present disclosure.

FIG. 2 is a block diagram to describe a 3D image converting device of a mobile terminal according to the present disclosure.

Figure 3:
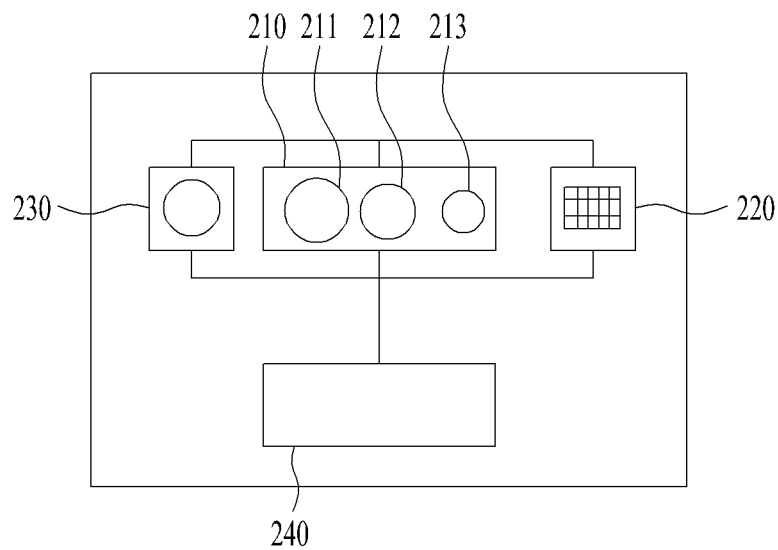
FIG. 3 is a diagram to describe a structure of a 3D image converting device of a mobile terminal according to the present disclosure.
Figure 3:
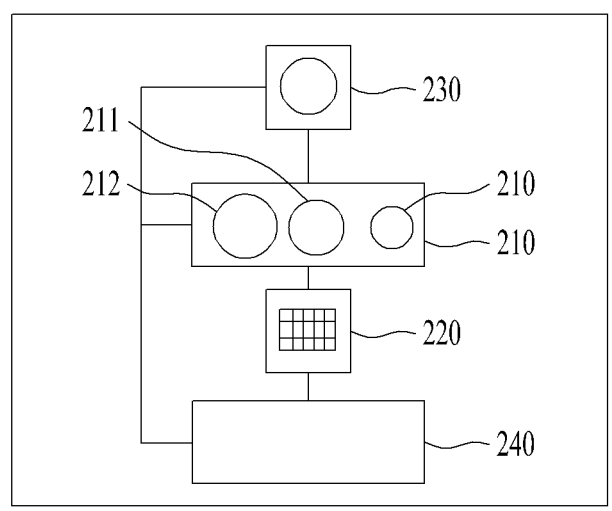

FIG. 3 is a diagram to describe a structure of a 3D image converting device of a mobile terminal according to the present disclosure.

Figure 4:
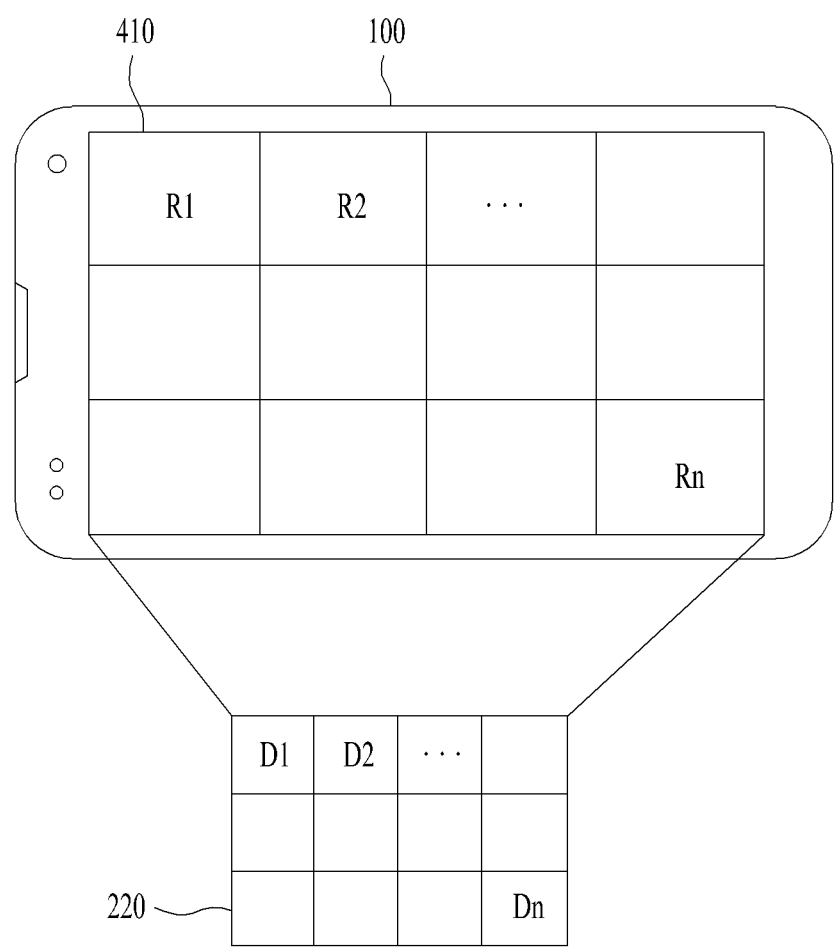
FIG. 4 is a diagram to describe a plurality of light emitting device arrays according to the present disclosure.

FIG. 4 is a diagram to describe a plurality of light emitting device arrays according to the present disclosure.

Figure 5:
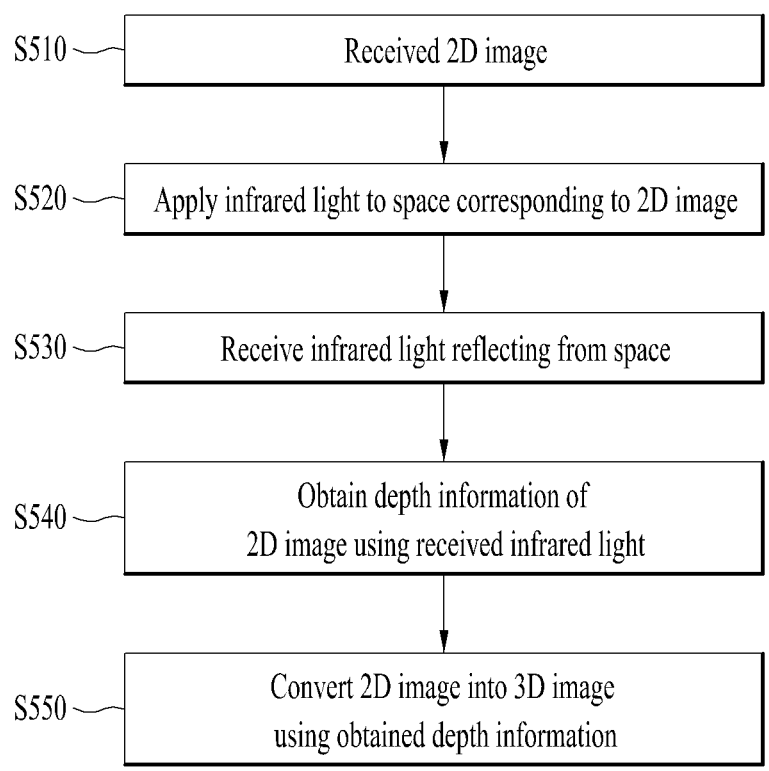
FIG. 5 is a flowchart showing a 3D image converting process of a 3D image converting device of a mobile terminal according to the present disclosure.

FIG. 5 is a flowchart showing a 3D image converting process of a 3D image converting device of a mobile terminal according to the present disclosure.

Figure 6:
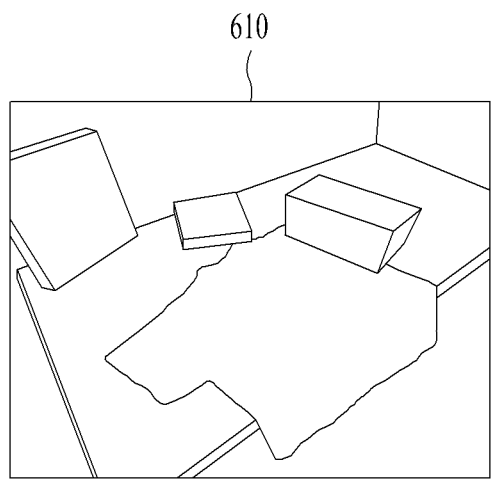
FIG. 6 is a diagram to describe a 2D image, an infrared image and a 3D image according to the present disclosure.
Figure 6:
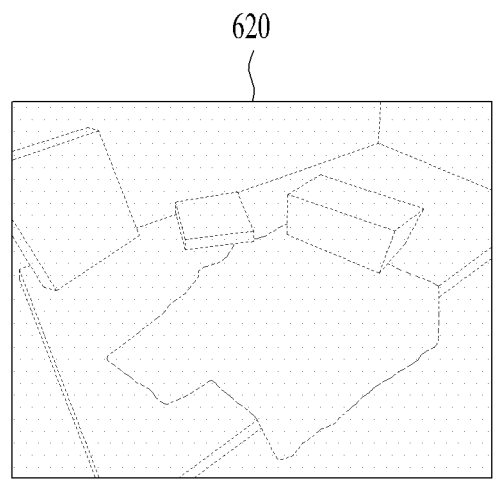
Figure 6:
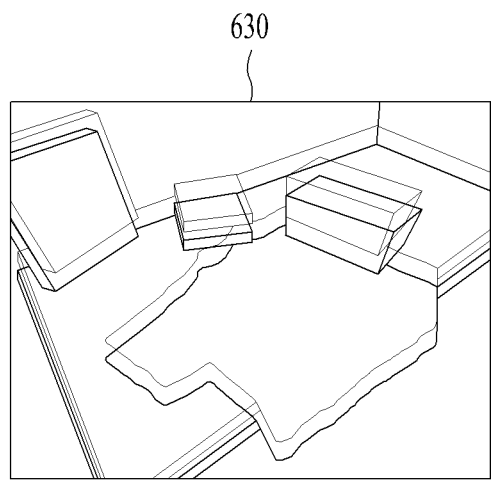

FIG. 6 is a diagram to describe a 2D image, an infrared image and a 3D image according to the present disclosure.

Figure 7:
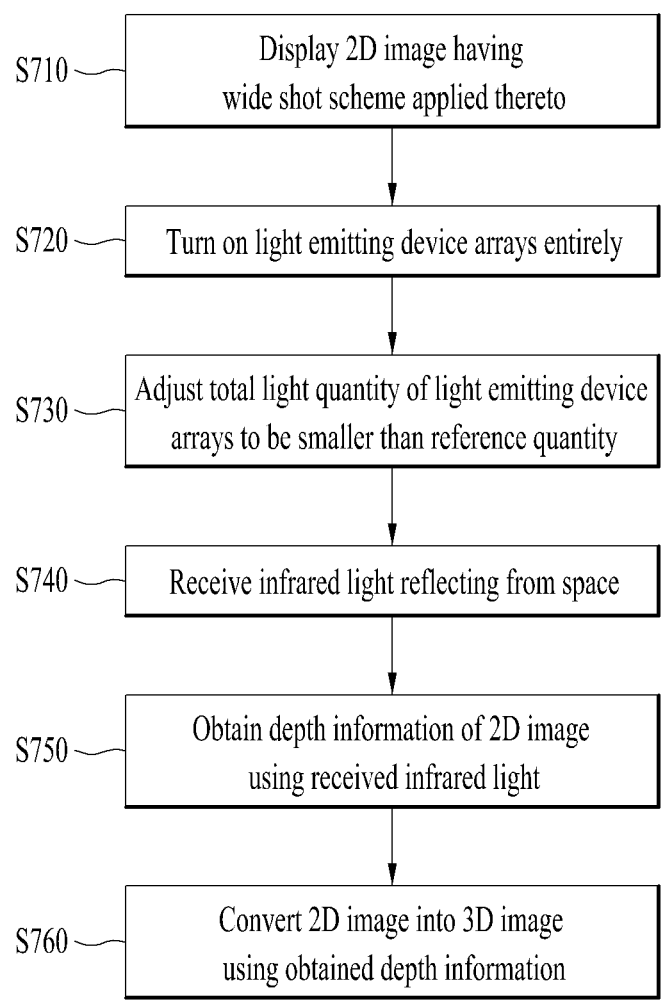
FIG. 7 is a flowchart showing a process for converting a wide shot scheme applied 2D image into a 3D image according to the present disclosure.

FIG. 7 is a flowchart showing a process for converting a wide shot scheme applied 2D image into a 3D image according to the present disclosure.

Figure 8:
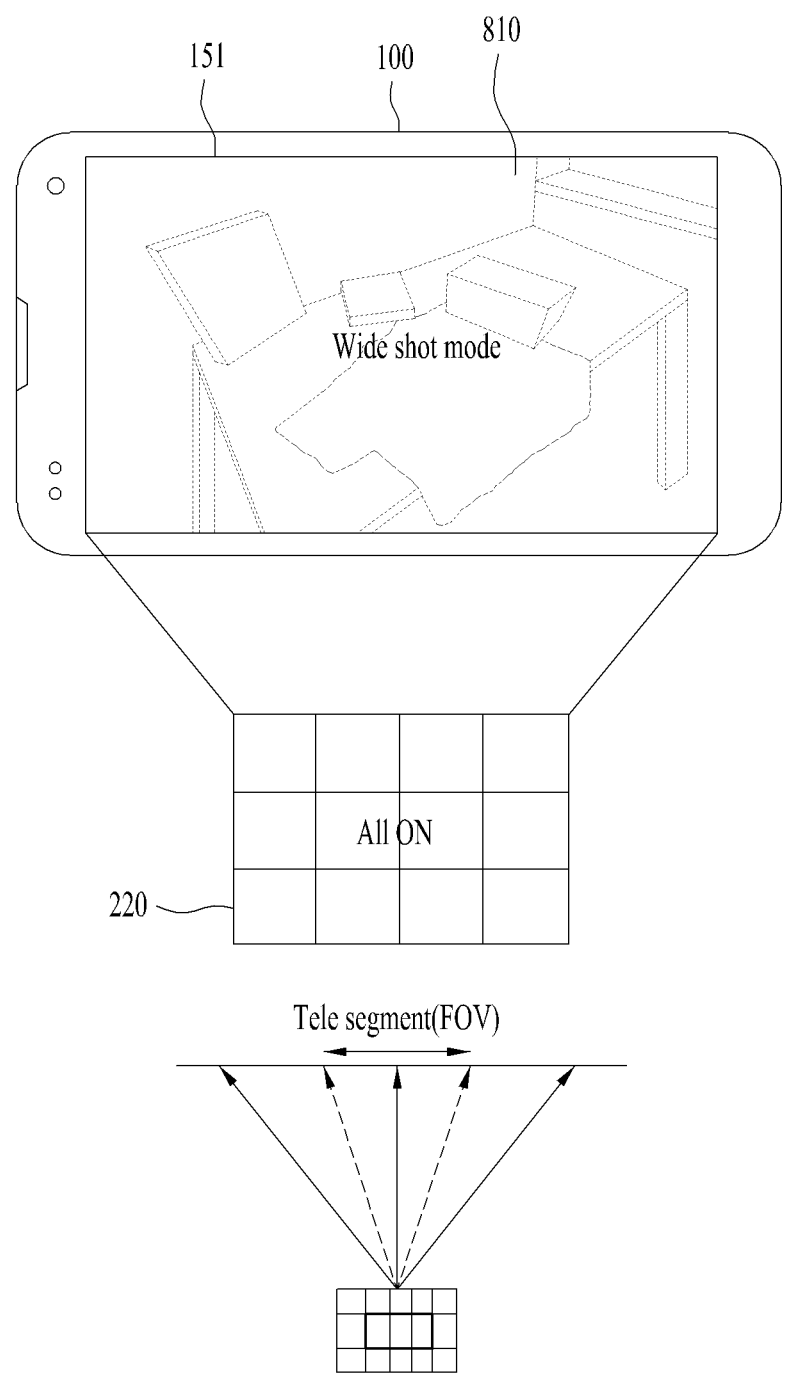
FIGS. 8 to 10 are diagrams showing a process for converting a wide shot scheme applied 2D image into a 3D image according to the present disclosure.
Figure 9:
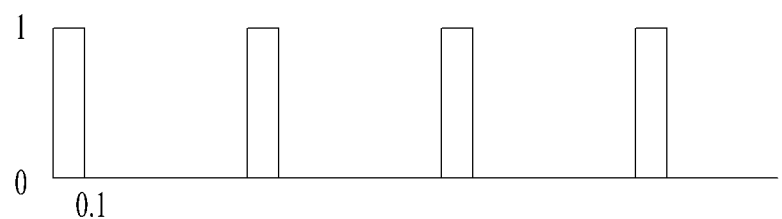
Figure 9:
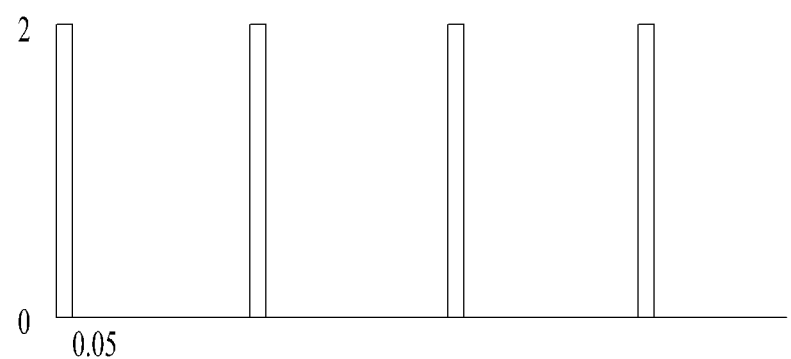
Figure 10:
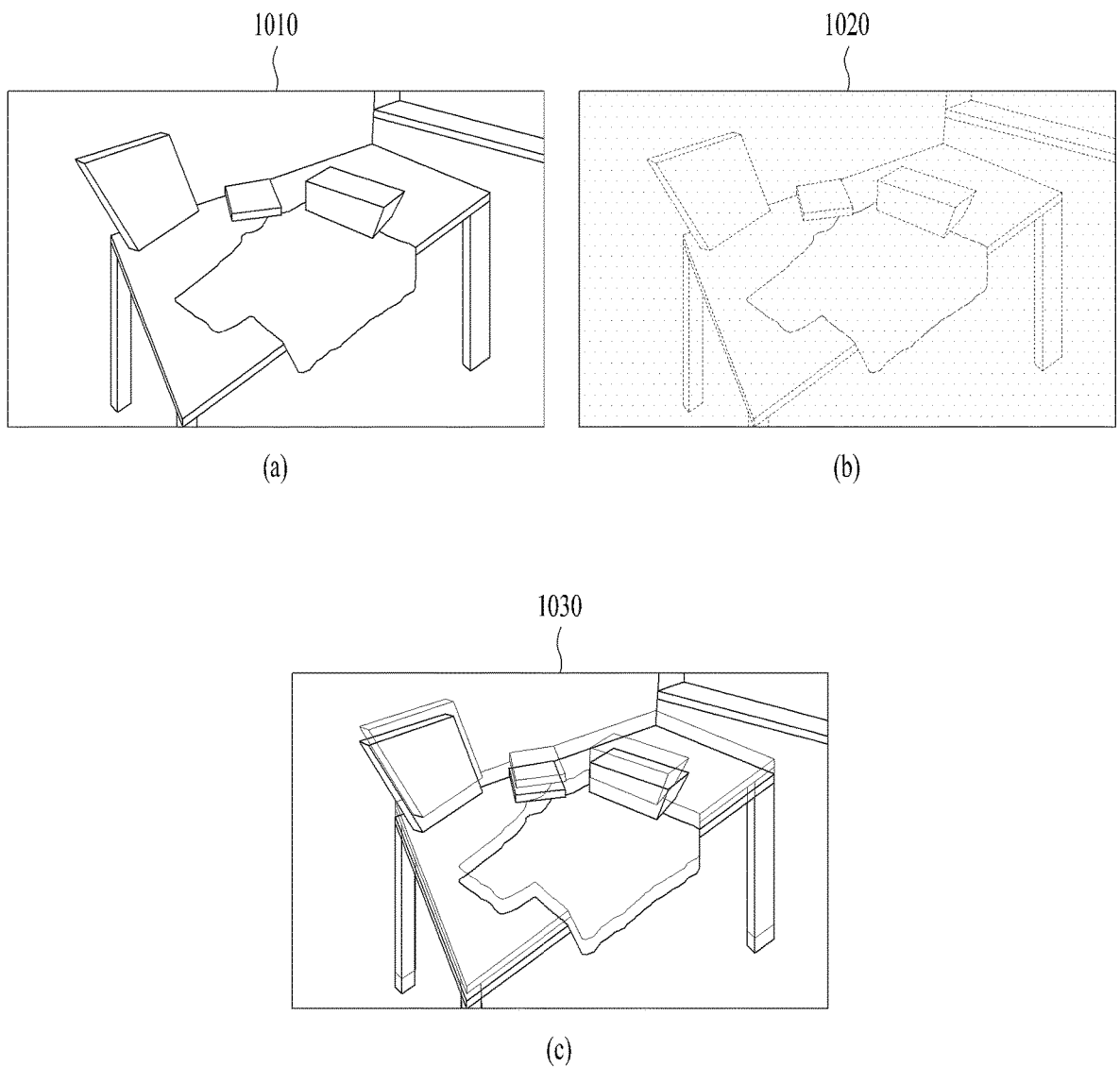

FIGS. 8 to 10 are diagrams showing a process for converting a wide shot scheme applied 2D image into a 3D image according to the present disclosure.

Figure 11:
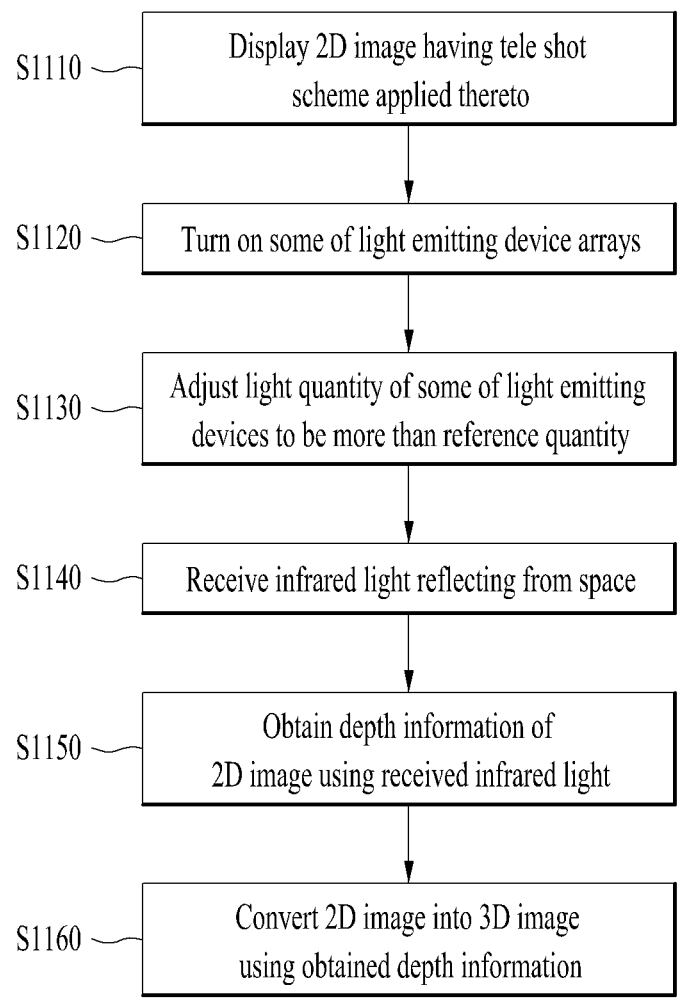
FIG. 11 is a flowchart showing a process for converting a tele shot scheme applied 2D image into a 3D image according to the present disclosure.

FIG. 11 is a flowchart showing a process for converting a tele shot scheme applied 2D image into a 3D image according to the present disclosure.

Figure 12:
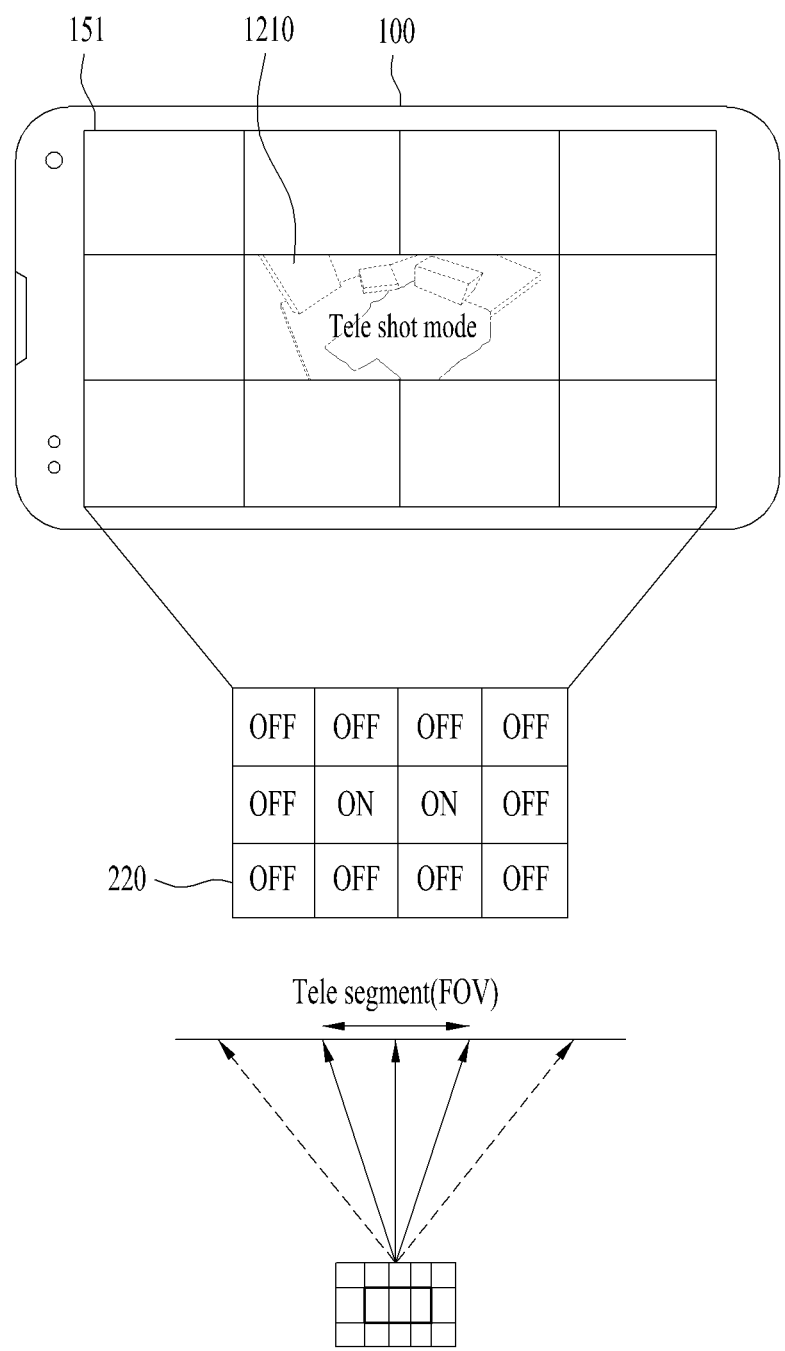
FIGS. 12 to 14 are diagrams to describe a process for converting a tele shot scheme applied 2D image into a 3D image according to the present disclosure.
Figure 13:
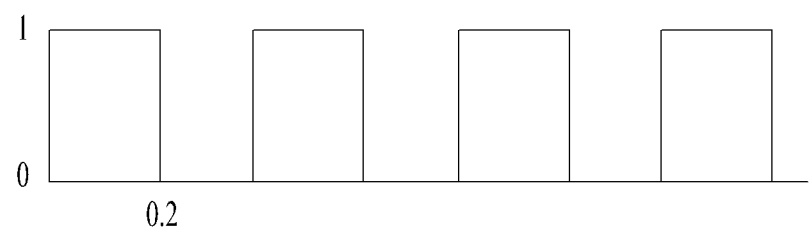
Figure 13:
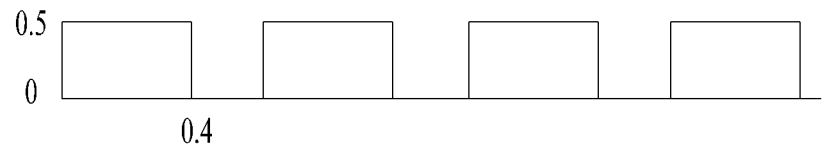
Figure 14:
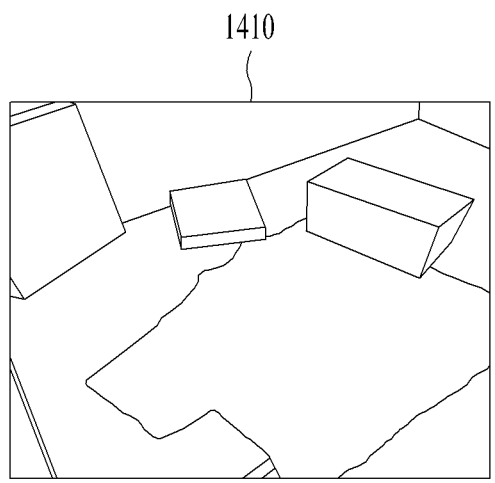
Figure 14:
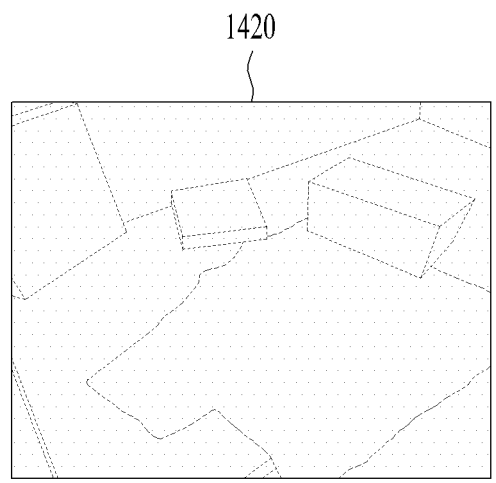
Figure 14:
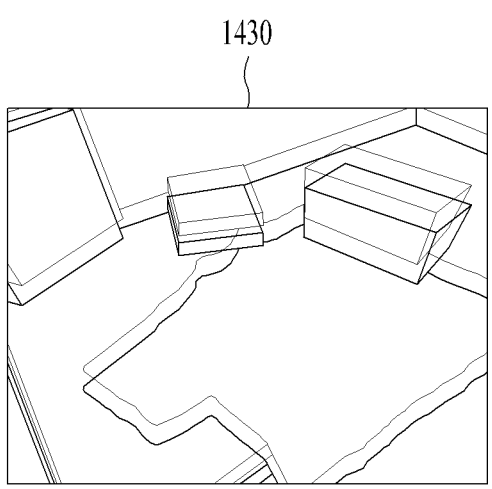

FIGS. 12 to 14 are diagrams to describe a process for converting a tele shot scheme applied 2D image into a 3D image according to the present disclosure.

Figure 15:
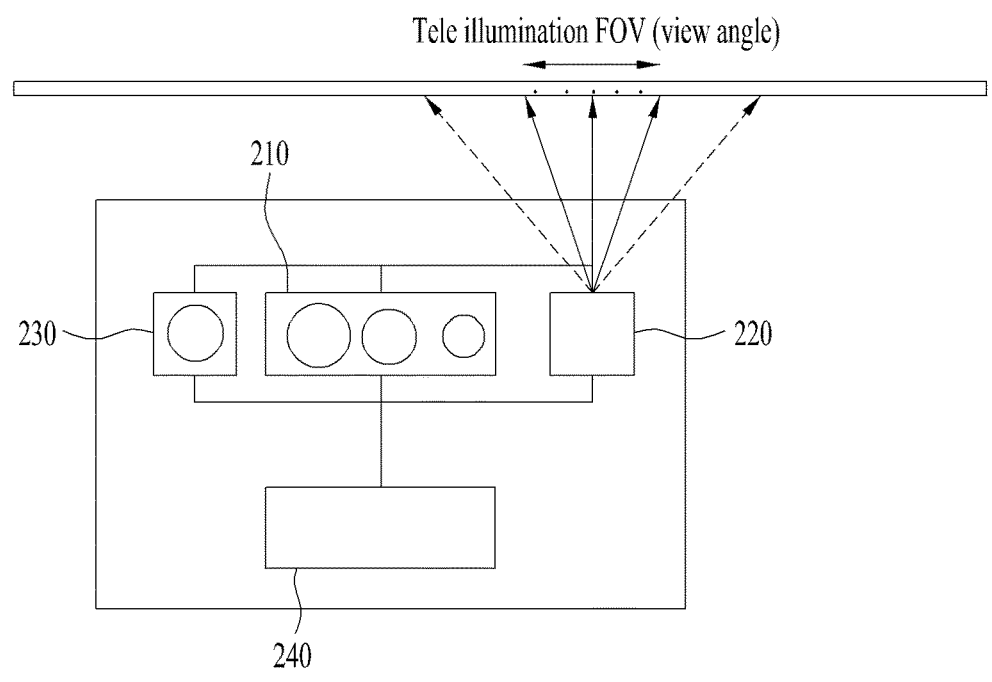
FIG. 15 is a diagram to describe an autofocusing operation in a wide or tele shot mode according to the present disclosure.
Figure 15:
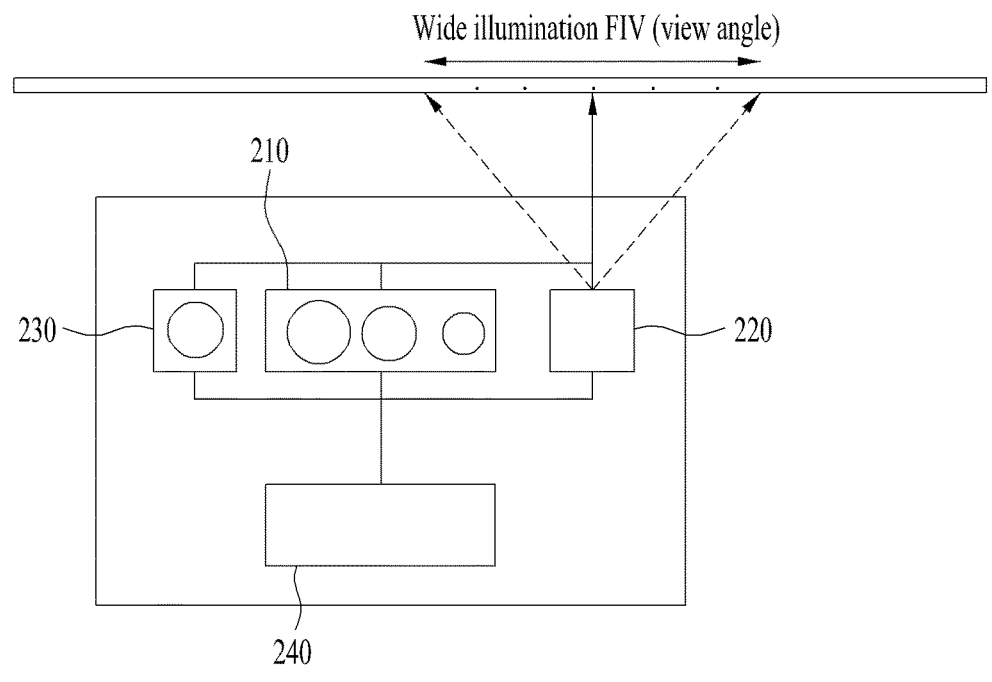

FIG. 15 is a diagram to describe an autofocusing operation in a wide or tele shot mode according to the present disclosure.

Figure 16:
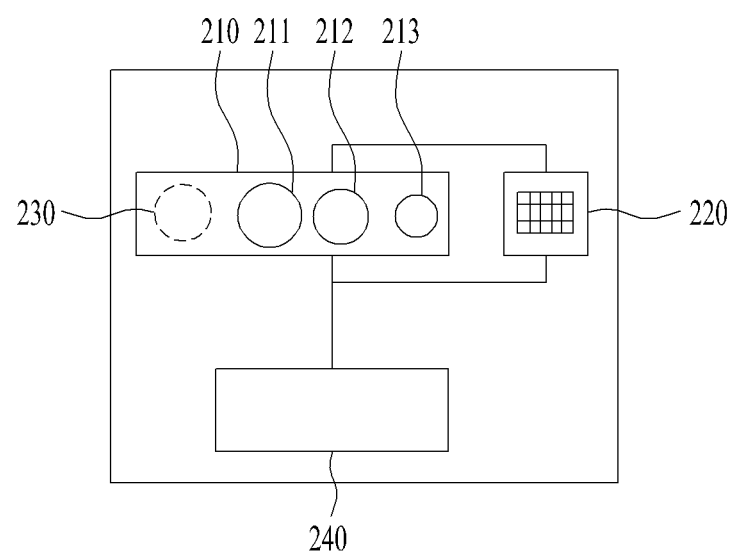
FIG. 16 is a diagram to describe a structure that a camera module and an infrared camera are combined into a single module according to the present disclosure.

FIG. 16 is a diagram to describe a structure that a camera module and an infrared camera are combined into a single module according to the present disclosure.

Referring to FIGS. 2 to 16, a 3D image converting apparatus 200 includes a camera module 210 having a plurality of cameras 211, 212 and 213 for 2D image shots according to a plurality of shot schemes, a light emitting unit 220 including a plurality of light emitting device arrays and applying infrared light to a space corresponding to a 2D image received via the camera module 210, an infrared camera 230 receiving an infrared image including the infrared light reflecting from the space, and a controller 240 obtaining depth information on the 2D image received via the camera module 210 using the infrared light received via the infrared camera 230 and converting the 2D image into a 3D image using the obtained depth information.

The depth information may mean a distance (or distance value) between an object (e.g., subject) corresponding to a pixel included in the 2D image and the mobile terminal (more particularly, the camera module 210).

For example, if the distance between the object (subject) in the 2D image and the mobile terminal 100 is d, the depth information of the specific pixel may be a specific value corresponding to the d. The specific value corresponding to the d may include the d or a value converted by a preset algorithm.

If coordinates of the 2D image are set on an x-axis and a y-axis vertical to the x-axis, the depth information may mean a value corresponding to a z-axis vertical to each of the x-axis and the y-axis. An absolute value of the depth information may increase in proportion to a distance between the object (subject) in the 2D image and the mobile terminal.

In some implementations, a plurality of the shot schemes may include a wide shot scheme for shooting a scene including an object located in a short distance at wide angle. In this case, the camera module 210 may include a wide camera 211 for a wide shot.

A plurality of the shot schemes may include a normal shot scheme for a normal 2D image shot. In this case, the camera module 210 may include a normal camera 212 for a normal shot.

A plurality of the shot schemes may include a tele shot scheme for shooting an object located in a long distance by zoom-in. In this case, the camera module 210 may include a tele camera 213 for a wide shot.

The above camera module 210 includes the wide camera 211 and the tele camera 213. In some cases, one of the wide camera 211 and the tele camera 213 may play a role as the normal camera 212.

On the other hand, to simply and clearly describe a 3D image converting process according to the present disclosure, the camera module 210 is just described differently from the camera 121 shown in FIG. 1, but the camera module 210 may include the camera shown in FIG. 1.

In this case, the first camera 121*a* and the second camera 121*b* of the camera 121 may play roles of the wide camera 211 and the tele camera 213, respectively. If so, the first and second cameras 121*a* and 121*b* may be installed on the same side such as a front side or a rear side.

On the other hand, to simply and clearly describe a 3D image converting process according to the present disclosure, the controller 240 shown in FIG. 2 is just described differently from the former controller 180 shown in FIG. 1, but all operations of the controller 240 shown in FIG. 2 may be performed by the controller 180 shown in FIG. 1.

When a 2D image shot is taken, if one of the wide shot scheme, the normal shot scheme and the tele shot scheme is selected via the touchscreen 151 or the user input unit 123 shown in FIG. 1, the controller 240 may activate the camera corresponding to the selected shot scheme among the wide camera 211, the normal camera 212 and the tele camera 213 of the camera module 210 and then receive a 2D image via the activated camera.

The light emitting unit 220 includes a plurality of infrared light emitting device arrays, each having 'm (rows)×n (columns)', and applies infrared light to a space corresponding to the 2D image received via the camera module 210.

In this case, the light emitting unit 220 may be installed around the camera module 210 or the infrared camera 230. In some cases, the light emitting unit 220 may be formed with the camera module 210 or the infrared camera 230 as an integral part.

A plurality of the infrared light emitting device arrays may include laser diodes converting electric signals into infrared light signals, e.g., VCSEL. A plurality of the infrared light emitting device arrays may apply infrared light toward an object (or subject) in the space.

The space corresponding to the 2D image may mean a space (i.e., view of scene) shot by the camera module 210 in a space (i.e., real space) other than a space occupied by the mobile terminal 100. For example, the space may be determined based on a view angle (or angle of field) of the camera module 210.

In addition, a specific light emitting device in a plurality of the infrared light emitting device arrays may be configured to apply infrared light to a space corresponding to specific pixel(s) (partial image or a portion) in the 2D image received via the camera module 210.

Meanwhile, the 3D image converting apparatus 200 of the present disclosure may extract depth information of a 2D image received via the camera module 210 in various ways.

For example, the controller 240 may extract depth information using a structure light method of extracting depth information using light emitting devices disposed to form a preset pattern, a Time of Flight (ToF) method of extracting depth information based on a time taken for light emitted from a light emitting device to reflect and return, or a combination thereof.

According to the structure light method, infrared light is applied to an object (subject) by controlling a plurality of light emitting device arrays disposed to have a preset pattern, the infrared light reflecting and returning from the object (subject) is detected, and depth information is then calculated based on the detected infrared light or a pattern of the infrared light.

Namely, the controller 240 controls a plurality of the light emitting device arrays, which are disposed to have a preset pattern, to apply infrared light to the object (subject).

Then, the controller 240 may detect the infrared light, which returns after reflecting from the object (subject), via the infrared camera 230.

In this case, the controller 240 may extract depth information of the 2D image received via the camera module 210 based on the detection result. For example, the controller 240 may extract depth information of the 2D image received via the camera module 210 by comparing a pattern formed by the reflecting and returning infrared light with the preset pattern or comparing a reflecting and returning time/intensity and the like of the applied infrared light.

The infrared camera 230 may include an Infrared Ray (IR) pass filter receiving infrared light reflecting from an object (subject) and letting the received infrared light pass through and an image sensor capable of infrared detection. The image sensor may be implemented as Charge Coupled Device (CCD) or Complementary Mental-Oxide Semiconductor (CMOS).

In addition, the infrared camera 230 may be configured to operate by interworking with the camera module 210 and have the same wide angle of the wide camera 211.

Referring to FIG. 3, the camera module 210, the light emitting unit 220 and the infrared camera 230 of the present disclosure may be relatively disposed at various locations.

For one example, as shown in FIG. 3 (a), centering around the camera module 210, the infrared camera 230 and the light emitting unit 220 may be disposed on left and right sides, respectively.

For another example, not shown in FIG. 3, centering around the camera module 210, the light emitting unit 220 and the infrared camera 230 may be disposed on left and right sides, respectively.

For another example, not shown in FIG. 3, centering around the infrared camera 230, the camera module 210 and the light emitting unit 220 may be disposed on left and right sides, respectively.

For another example, not shown in FIG. 3, centering around the infrared camera 230, the light emitting unit 220 and the camera module 210 may be disposed on left and right sides, respectively.

For another example, not shown in FIG. 3, centering around the light emitting unit 220, the camera module 210 and the infrared camera 230 may be disposed on left and right sides, respectively.

For another example, not shown in FIG. 3, centering around the light emitting unit 220, the infrared camera 230 and the camera module 210 may be disposed on left and right sides, respectively.

For another example, as shown in FIG. 3 (b), centering around the camera module 210, the infrared camera 230 and the light emitting unit 220 may be disposed on top and bottom sides, respectively.

For another example, not shown in FIG. 3, centering around the camera module 210, the light emitting unit 220 and the infrared camera 230 may be disposed on top and bottom sides, respectively.

For another example, not shown in FIG. 3, centering around the infrared camera 230, the camera module 210 and the light emitting unit 220 may be disposed on top and bottom sides, respectively.

For another example, not shown in FIG. 3, centering around the infrared camera 230, the light emitting unit 220 and the camera module 210 may be disposed on top and bottom sides, respectively.

For another example, not shown in FIG. 3, centering around the light emitting unit 220, the camera module 210 and the infrared camera 230 may be disposed on top and bottom sides, respectively.

For another example, not shown in FIG. 3, centering around the light emitting unit 220, the infrared camera 230 and the camera module 210 may be disposed on top and bottom sides, respectively.

In some implementations, as shown in FIG. 4, the controller 240 may control turn-on/turn-off of each of a plurality of the infrared light emitting devices included in the light emitting unit 220 according to the present disclosure and also control turn-on/turn-off of at least two of the light emitting devices in unit of group.

For example, a first group D1 among a plurality of groups D1 to Dn, each of which includes at least one infrared light emitting device, may be configured to emit infrared light to a space corresponding to a first region R1 in an image 410 received via the camera module 210 and displayed on the display unit 151.

Furthermore, a second group D2 among a plurality of groups D1 to Dn, each of which includes at least one infrared light emitting device, may be configured to emit infrared light to a space corresponding to a second region R2 in the image 410 received via the camera module 210 and displayed on the display unit 151.

Meanwhile, the controller 240 may differently control the drive of the infrared light emitting devices included in the light emitting unit 220 depending on the shot scheme applying to the image 410.

For one example, if the wide shot scheme applies to the image 410, the controller 240 may turn on all of a plurality of the infrared light emitting devices in the light emitting unit 220 and then control all the infrared light emitting devices to discharge infrared light to a space corresponding to the image 410.

For another example, if the tele shot scheme applies to the image 410, the controller 240 may only turn on some infrared light emitting devices corresponding to pixel regions of the tele shot scheme applied image 410 among all of a plurality of the infrared light emitting devices in the light emitting unit 220 and turn off the rest of the infrared light emitting devices. Thereafter, the controller 240 may control the some infrared light emitting devices to discharge infrared light to a space corresponding to the pixel regions of the tele shot scheme applied image 410.

Referring to FIG. 5, if an image shot command is received via the touchscreen 151 or the user input unit 123, the controller 240 receives a 2D image via the camera module 210 [S510]. The controller 240 may then display the received 2D image on the touchscreen 151.

If a command for converting the 2D image into a 3D image is received via the touchscreen 151 or the user input unit 123, in order to obtain depth information of at least one object (subject) included in the 2D image, the controller 240 activates the infrared camera 230 and controls a plurality of the infrared light emitting device arrays of the light emitting unit 220 to apply infrared light to at least one actual object (subject) located in a space corresponding to the 2D image [S520].

If a prescribed region in the 2D image displayed on the touchscreen 151 is selected, the controller 240 may control only at least one infrared light emitting device corresponding to the selected region in a plurality of the infrared light emitting device arrays to apply infrared light to a space corresponding to the selected region.

The controller 240 receives the infrared light reflecting and returning from the space via the infrared camera 230 [S530] and obtains the depth information on the at least one object included in the 2D image by comparing a pattern formed by the received infrared light with a preset pattern or comparing at least one of a time taken for the applied infrared light to reflect and return and an intensity of the returning infrared light after reflection [S540].

Then, the controller 240 converts the 2D image into a 3D image by reflecting the obtained depth information in the at least one object in the 2D image.

In doing so, the controller 240 may switch the 2D image displayed on the touchscreen 151 to the converted 3D image and then display the converted 3D image. In addition, the controller 240 may display both of the 2D image and the converted 3D image on the touch screen 151. Furthermore, the controller 240 may display the 2D image, an infrared image received via the infrared camera 230, and the converted 3D image together.

For example, FIG. 6 (*a*) shows a 2D image 610 taken via the camera module 210, FIG. 6 (*b*) shows an infrared image 620 for the 2D image 610 taken via the infrared camera 230, and FIG. 6 (*c*) shows a 3D image 630 in which depth information on the 2D image 610 is reflected.

On the other hand, as shown in FIGS. 7 to 14, the controller 240 may control the infrared light emitting devices, which are included in the light emitting unit 220, to be driven differently depending on a shot scheme applying to the image 410.

In case that a wide shot scheme applies to a 2D image, a process for converting the 2D image into a 3D image will be described in detail with reference to FIGS. 7 to 10 as follows.

Referring to FIGS. 7 to 10, if an image shot command is received via the touchscreen 151 or the user input unit 123, the controller 240 receives a 2D image via the camera module 210 [S510]. The controller 240 may then display the received 2D image on the touchscreen 151.

Subsequently, if a command for applying a wide shot scheme to the 2D image is received via the touchscreen 151 or the user input unit 123, the controller activates the wide camera 211 and displays a wide 2D image received via the wide camera 211 on the touchscreen [S710]. The wide 2D image may mean an image shot at an angle wider than that of a normal 2D image received via the normal camera 212.

Thereafter, if a command for converting the wide 2D image into a 3D image is received via the touchscreen 151 or the user input unit 123, in order to obtain depth information of at least one object (subject) included in the wide 2D image, the controller 240 activates the infrared camera 230, as shown in FIG. 8, turns on all the infrared light emitting devices included in a plurality of the infrared light emitting device arrays of the light emitting unit 220, and controls all the turned-on infrared light emitting devices to apply infrared light to at least one actual object (subject) located in a space corresponding to the wide 2D image [S720].

In this case, it is not necessary for a light quantity of the infrared light, which is applied by the light emitting unit 220, to become maximum in taking a shot of a short-range object using the wide shot scheme Therefore, in case of controlling the light quantity of the light emitting unit 220 in a wide shot mode, the entire infrared light emitting devices of the light emitting unit 220 are turned on but the light quantity of the entire infrared light emitting device is adjusted to be smaller than a preset reference quantity, whereby unnecessary power consumption in an environment of the mobile terminal 100, of which battery life is significant, can be reduced [S730].

For example, the controller 240 may set a pulse width for a light quantity of the entire infrared light emitting devices to be shorter than a preset reference width [FIG. 9 (*a*)], or set an intensity of a pulse width for a light quantity of the entire infrared light emitting devices to become greater than a preset reference intensity [FIG. 9 (*b*)].

Subsequently, the controller 240 receives the infrared light reflecting and returning from the space via the infrared camera 230 [S740] and obtains depth information on at least one object included in the wide 2D image by comparing a pattern formed by the received infrared light with a preset pattern or comparing at least one of a time taken for the applied infrared light to reflect and return and an intensity of the returning infrared light after reflection [S750].

Then, the controller 240 converts the wide 2D image into a 3D image by reflecting the obtained depth information in the at least one object in the wide 2D image [S760].

For example, FIG. 10 (*a*) shows a wide 2D image 1010 shot via the wide camera 211, FIG. 10 (*b*) shows an infrared image 1020 shot via the infrared camera 230 for the wide 2D image 1010, and FIG. 10 (*c*) shows a 3D image 1030 having depth information reflected in the wide 2D image 1010.

In case that a tele shot scheme applies to a 2D image, a process for converting the 2D image into a 3D image will be described in detail with reference to FIGS. 11 to 14 as follows.

Referring to FIGS. 11 to 14, if an image shot command is received via the touchscreen 151 or the user input unit 123, the controller 240 receives a 2D image via the camera module 210. The controller 240 may then display the received 2D image on the touchscreen 151.

Subsequently, if a command for applying a tele shot scheme to the 2D image is received via the touchscreen 151 or the user input unit 123, the controller activates the tele camera 213 and displays a tele 2D image received via the tele camera 213 on the touchscreen [S1110]. The tele 2D image may mean an image shot by zooming in more telescopically than a normal 2D image received via the normal camera 212.

Thereafter, if a command for converting the tele 2D image into a 3D image is received via the touchscreen 151 or the user input unit 123, in order to obtain depth information of at least one object (subject) included in the tele 2D image, the controller 240 activates the infrared camera 230, as shown in FIG. 12, turns on only some infrared light emitting devices corresponding to pixel areas of the tele 2D image among all the infrared light emitting devices in the light emitting unit 220 and turns off the rest of the infrared light emitting devices. The controller 240 then controls some of the infrared light emitting devices to apply infrared light to at least one actual object (subject) located in a space corresponding to the pixel areas of the tele 2D image [S1120].

Namely, the tele camera 213 in a tele shot mode has a view angle smaller than that of the wide camera 211 and is configured to shoot an object (subject) located at a long distance by zoom-in in the tele shot mode. The tele camera 213 only turns on and uses infrared light emitting devices located at a center area for applying infrared light a space corresponding to the zoom-in object among the infrared light emitting devices of the light emitting unit 220 but turns off infrared light emitting devices applying infrared light to a space failing to corresponding to the zoom-in object, whereby power consumption can be reduced.

In this case, the controller 240 adjusts a light quantity of some infrared light emitting devices located at the center area to become greater than a preset reference quantity, thereby further raising an obtaining rate of depth information [S1130].

Namely, as shown in FIG. 13 (a), the controller 240 may set a pulse width for a light quantity of the some infrared light emitting devices to be longer than that a preset reference width. As shown in FIG. 13 (b), the controller 240 may increase the pulse width for the light quantity of the some infrared light emitting devices and adjust the strength of the pulse width to become weaker than a preset reference strength.

In some implementations, the controller 240 may crop a prescribed region corresponding to the tele 2D image within the infrared image received from the infrared camera 230 and obtain depth information from the cropped prescribed image.

In addition, the controller 240 may perform binning on pixels of a central part of the infrared camera 230 and then use the binned pixels to raise sensitivity of a target object at a long distance.

Meanwhile, although a drive method is similar to the tele shot method in normal shot mode at an intermediate view angle, since a view angle of the normal camera 212 is greater than that of the tele camera 213 but smaller than that of the wide camera 211, the infrared light emitting devices of the light emitting unit 220 may be used more than the tele shot mode or equal to or smaller than the wide shot mode.

On the other hand, the controller 240 receives the infrared light reflecting and returning from the space via the infrared camera 230 [S1140] and obtains depth information on at least one object included in the tele 2D image by comparing a pattern formed by the received infrared light with a preset pattern or comparing at least one of a time taken for the applied infrared light to reflect and return and an intensity of the returning infrared light after reflection [S1150].

Then, the controller 240 converts the tele 2D image into a 3D image by reflecting the obtained depth information in the at least one object in the tele 2D image [S1160].

For example, FIG. 14 (a) shows a tele 2D image 1410 shot via the tele camera 213, FIG. 14 (b) shows an image 1420 generated from cropping a prescribed region corresponding to the tele 2D image in the infrared image shot via the infrared camera 230, and FIG. 14 (c) shows a 3D image 1430 having depth information reflected in the tele 2D image 1410.

FIG. 15 is a diagram to describe an autofocusing operation in a wide or tele shot mode according to the present disclosure.

As shown in FIG. 15 (a), if a view angle at which a plurality of the infrared light emitting device arrays of the light emitting unit 220 apply infrared light is smaller than a preset view angle and the number of the infrared light emitting devices in the array is smaller than a preset number, although the camera module 210 and the infrared camera 230 are driven in a manner of interworking with each other, they show different characteristics.

Namely, since the view angle of the arrays is smaller, it is unable to synchronize all regions of the wide shot mode of the wide camera 211. Yet, since the view angle of the arrays is smaller and the number of the infrared light emitting devices in the arrays is small, a module may be made with low manufacturing cost.

Moreover, in this case, a distance to an object (subject) is measured in the synchronization of the camera module 210 and the infrared camera 230, whereby an accurate autofocusing function of the camera module 210 can be provided.

In this case, by decreasing the view angle of the array and the number of the infrared light emitting devices in the array, it will focus on measuring the central distance of the object (subject).

Namely, if a preview image is received via the camera module 210, the controller 240 may control the infrared light emitting devices in the array, which have the small number and the small view angle, to apply infrared light to an object in front, receive the infrared light returning by reflecting from the object via the infrared camera 230, measure a distance between the object and the infrared camera 230 using the received infrared light, and control autofocusing to be performed on the object in the preview image received from the camera module 210 depending on the measured distance.

So to speak, although there are various autofocusing methods, if the direct distance measurement method using the light emitting unit 220 and the infrared camera 230 like the present disclosure is employed, a more accurate and faster autofocusing function can be provided.

In this case, by decreasing a view angle of an IR supplementary light and the number of spots of VCSEL, it may focus on measuring a distance of a central part of a target.

Furthermore, as shown in FIG. 15 (b), although a view angle at which a plurality of the infrared light emitting device arrays of the light emitting unit 220 apply infrared light is greater than the preset view angle, if the number of the infrared light emitting devices in the array is smaller than the preset number, since the number of the infrared light emitting devices in the array is small despite that the camera module 210 and the infrared camera 230 are driven in a manner of interworking with each other, performance of depth information obtainment is lowered.

In this case, like the aforementioned case of FIG. 15 (a), it may be usable for the autofocusing of the camera module 210, but there is a difference in that a central region of an image supports the autofocusing only. On the other hand, the case shown in FIG. 15 (b) is advantageous in that autofocusing is available for an ambient region of a wide image. Hence, since the autofocusing is available for the ambient region as well as the center of the wide image, an overall balanced focus image may be provided to a user.

Namely, if a preview image is received via the camera module 210, the controller 240 may control the infrared light emitting devices in the array to apply infrared light to an entire front, receive the infrared light returning by reflecting from the entire front via the infrared camera 230, measure distances between the entire front and the infrared camera 230 using the received infrared light, and control autofocusing to be performed on the preview image received from the camera module 210 depending an average of the measured distances.

FIG. 16 is a diagram to describe a structure that a camera module and an infrared camera are combined into a single module according to the present disclosure.

As shown in FIG. 16, the camera module 210 and the infrared camera 230 of the present disclosure may be manufactured into a single combined module.

In this case, a 2D image may be received from the camera module 210 sequentially in frame unit and an infrared image may be received from the infrared camera 230.

For example, 2D images may be received from the camera module 210 in the odd-numbered frames and 2D images may be received from the camera module 210 in the even-numbered frames.

As described above, since the camera module 210 and the infrared camera 230 have the single unified module structure, the size and manufacturing cost can be lowered advantageously.

It will be understood by those skilled in the art that various modifications and variations can be made in the present disclosure without departing from the spirit or scope of this invention.

The present disclosure mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal.

Accordingly, the foregoing embodiments are merely exemplary and are not to be considered as limiting the present disclosure. Thus, it is intended that the present disclosure covers the modifications and variations of this disclosure that come within the scope of the appended claims and their equivalents.

What is claimed is:

1. A mobile terminal, comprising:
a first camera configured to receive a two-dimensional (2D) image;
a light emitting unit including a plurality of light emitting device arrays and configured to apply light to a space corresponding to the 2D image;
a second camera configured to receive light reflected from the space based on the light emitted from the light emitting unit; and
a controller configured to:
obtain depth information on the 2D image based on the received light and convert the 2D image into a three-dimensional (3D) image based on the obtained depth information,
in response to a shot scheme being set to a wide shot scheme, turn on all of the plurality of light emitting device arrays and set a pulse width for controlling an on time of all of the plurality of light emitting device arrays to be shorter than a preset reference pulse width, and
in response to a shot scheme being set to a tele shot scheme, turn on only a subset of the plurality of light emitting device arrays and set a pulse width for controlling an on time of the subset of the plurality of light emitting device arrays to be longer than the preset reference pulse width.

2. The mobile terminal of claim 1, wherein the depth information includes depth information on at least one object included in the 2D image.

3. The mobile terminal of claim 1, wherein the light emitting unit includes a plurality of infrared light emitting device arrays and wherein the second camera includes an infrared camera receiving an infrared light reflecting from the space.

4. The mobile terminal of claim 3, further comprising a display unit, wherein the controller displays the 2D image, an infrared image for the 2D image received via the second camera and the 3D image on the display unit together.

5. The mobile terminal of claim 4, wherein the 2D image, the infrared image and the 3D image are displayed on a same screen and are spaced apart from each other.

6. The mobile terminal of claim 1, wherein the controller adjusts a light quantity of all of the plurality of the light emitting device arrays into a level lower than a preset light quantity when in the shot scheme is set to the wide shot scheme.

7. The mobile terminal of claim 1, wherein the subset of the plurality of light emitting device arrays includes an array corresponding to a central region among a plurality of the light emitting device arrays.

8. The mobile terminal of claim 1, wherein the controller adjusts a light quantity of the subset of the plurality of light emitting device arrays into a level higher than a preset light quantity.

9. A method for three-dimensional (3D) image conversion, the method comprising:
receiving a two-dimensional (3D) image via a first camera;
applying light to a space corresponding to the 2D image via a light emitting unit including a plurality of light emitting device arrays;
receiving light reflected from the space based on the light emitted by the light emitting unit via a second camera;
obtaining depth information on the 2D image based on the received light;
converting the 2D image into a 3D image based on the obtained depth information;
in response to a shot scheme being set to a wide shot scheme, turning on all of the plurality of light emitting device arrays and setting a pulse width for controlling an on time of all of the plurality of light emitting device arrays to be shorter than a preset reference pulse width; and
in response to a shot scheme being set to a tele shot scheme, turning on only a subset of the plurality of light emitting device arrays and setting a pulse width for controlling an on time of the subset of the plurality of light emitting device arrays to be longer than the preset reference pulse width.

10. The method of claim 9, wherein the light emitting unit includes a plurality of infrared light emitting device arrays and wherein the second camera includes an infrared camera receiving an infrared light reflecting from the space.

11. The method of claim 9, wherein the wide shot scheme adjusts a light quantity of all of the plurality of the light emitting device arrays into a level lower than a preset light quantity.

12. The method of claim 9, wherein the tele shot scheme adjusts a light quantity of the subset of the plurality of light emitting device arrays into a level higher than a preset light quantity.

13. The method of claim 9, further comprising:
- displaying, via a displace device, the 2D image, an infrared image for the 2D image received via the second camera, and the 3D image on a same screen, which are spaced apart from each other.

* * * * *